P. KOLLSMAN

Dec. 29, 1931. INDICATOR Re. 18,306

Original Filed Aug. 6, 1929

Inventor:
Paul Kollsman
By his Attorneys:
Beeler & Schumacher

Reissued Dec. 29, 1931 Re. 18,306

UNITED STATES PATENT OFFICE

PAUL KOLLSMAN, OF WOODHAVEN, NEW YORK, ASSIGNOR TO KOLLSMAN INSTRUMENT COMPANY, INC., OF BROOKLYN, NEW YORK, A CORPORATION OF NEW YORK

INDICATOR

Original No. 1,741,702, dated December 31, 1929, Serial No. 383,931, filed August 6, 1929. Reissue No. 18,072, dated May 19, 1931, Serial No. 504,188, filed December 22, 1930. This application for reissue filed November 5, 1931. Serial No. 573,265.

This invention relates to indicators.

One object of the invention is to provide an improved device of the character described in which a reference member and an indicating member are associated together for a synchronous movement for any required condition, and a supplemental object is to cause a plurality of reference means to be simultaneously actuated in different degrees in setting the device.

While this invention is applicable to a wide range of uses, and in connection with indicating devices of various types, it may be stated that in certain indicators a reference mark is mounted for movement together with a dial to permit a rapid reading to be made of the condition shown by the pointer. This arrangement has the disadvantage that when the dial is turned from its initial position, the indicia thereon are no longer vertical, so that it becomes difficult to note the indicator reading. Furthermore, it is not possible on a comparatively small dial to obtain a reading which will be sufficiently accurate within a large range, as is done, for example, with indicators having a plurality of co-ordinated pointers, which coact with scales of different values. It is therefore an object of this invention to overcome these drawbacks.

Other objects of this invention are to provide an improved device of the nature set forth having a movable reference means which is synchronized with a plurality of pointers movable in different degrees, with means for actuating the pointers, and other independently movable means for causing a setting of the reference means; also to provide means for causing a relative setting movement between pointers and scales, in different degrees; relative movements between reference means and indicator for an instantaneous complete setting; improved means for causing the several movements separately and in different co-ordinations and combinations, and so that setting and indicating movements may occur simultaneously.

Another object of the invention is to provide a device including a rotary indicator and reference means, and improved setting means for moving the same in any required relative rate of speed with respect to a stationary scale means so that the indicator may move a plurality of pointers in synchronism with each other.

A further object is to provide improved simplified mechanism for the device, including gears compactly arranged in a novel manner for setting the device and including a gear train for interconnecting the spindles arranged and mounted in an improved manner to cause continuous synchronous movement of the pointers in setting as well as in normal indicating action while permitting a high degree of sensitivity in the device.

Further objects are to provide a device including an indicator, reference means and pointer, the latter having independent drive means and there being a unitary means for operating both of the drive means for setting the device, all arranged and co-ordinated in an improved manner; a reference means which is permanently connected to the indicator in an improved manner to rotate therewith in permanent and hence fixed association in setting the device; a device having relatively few and simple parts, which is inexpensive to manufacture and assemble, reliable and efficient in use, easy and convenient to operate, and susceptible of use under many different conditions.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

Figure 1:
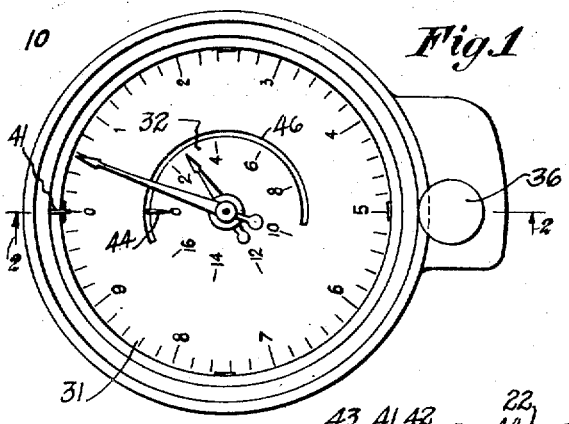
Figure 1 is an plan view of a device embodying the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

Generally described, the invention provides an indicator of any well known type, preferably a pressure sensitive indicator, having indicia of any suitable nature which are formed on or may include a scale, or scales, or reference means, according to any desired type, including, for instance, the cylindrical and circular scales. Co-ordinated with the scale are one or more pointers or reading elements and also one or more reference marks, if desired. The latter may be variously formed, and can also be in the nature of graduated scales, while the pointers may, as in the case of the reference means, be broadly considered as an indicating means. The pointers, reference marks, or both are movable synchronously by and desired means, whether manually or mechanically, for an initial setting. The indicator per se may turn with the pointers in setting, maintaining an accurate reading under all conditions; but the indicator and one or both of the scales may be, in a more general sence, rotatable or otherwise movable relatively to each other, and one or both of the pointers may be moved in suitable co-ordination, where necessary, to maintain an accurate relation of the parts to the scales; thus one of the pointers and its scale may be movable relatively to each other at a different rate than the other pointer and its scale. Since the scales for the different pointers have different values, the pointers together with their corresponding reference marks are movable at relatively different speeds according to such values, both in setting the device and in the normal indicating action thereof. With scales having uniform divisions, all such movements may be in synchronism, while if the divisions vary in size, the said movements may correspondingly vary, or may be defined as synchronized with respect also to the scale divisions or means; and all movements herein referred to must generally be construed with regard to the nature of the scales. It may be noted that the scale for the more sensitive readings may be omitted, since the operator's eye is often sufficient to judge or observe a sufficient movement of the sensitive pointer. The mechanism for interconnecting the pointers, the reference mark, and the indicator itself for turning is merely illustrative, and the result may be accomplished in other ways. Although the indicator is shown herein as turning in presetting the device, it may be understood that this is done in order to simplify the said mechanism and is not of the essence of the invention.

Improved features of the mechanism reside in providing a drive interconnecting the pointers or spindles thereof and having fixed connection with the rotary pressure sensitive indicator at one point and at another with a relatively stationary mounting member or part movable relatively to the indicator. Thus the pointers are caused to move at different rates according to the scales, both in setting the device and in normal indicating action, whereby accurate reading of the device is constantly maintained. The significance of the fixed connection mentioned is that a pressure sensitive device moves its pointer back and forth with pressure variation and always returns the pointer to zero or other predetermined position relative to the scales, or indicator itself or both. Reference marks for one or both of the pointers may also be moved together with or independently of their respective pointers in setting the device, and are otherwise relatively stationary in ordinary indication action. For simplicity, one of the pointer spindles may rotate directly with the indicator, and the other at different or reduced speed by the drive mentioned which may simply interconnect the spindles; accordingly one of the reference marks may move at the same relative rate as the indicator and the other at a different relative rate, although it may suffice that the reference marks shall move simultaneously in different degrees. The arrangement of the device and the mechanism thereof is such that the indicating motion is independent of the setting action, assuring sensitivity, and in fact both motions or actions may occur simultaneously without any variation whatever in the accuracy of the reading. For setting the device, a unitary means may be used, for instance, a gear or other drive for relative turning of the indicator and reference marks and for causing simultaneous relative motion of the pointers by their drive connected to the stationary or other mounting aforementioned. In moving the indicator relative to a dial for setting, the arrangement of the mechanism is such that, in the case of a pointer, reference mark or both moving relatively to the indicator, for example, the drives for the pointer and reference mark may be independent for a sensitive actuation of the former, but a unitary drive may co-ordinate both of the drives mentioned to produce the desired synchronous movements. Furthermore, a reference mark that moves with respect to the indicator is preferably so permanently interconnected therewith that in rotating the indicator, the reference mark moves in the predetermined relation thereto. The nature of the drive for setting the indicator and reference marks may be shown by referring to a large diameter drive element between the indicator and dial operated with speed reduction by said unitary means, which also engages a large diameter drive element of the indicator. A compact and simple structure is produced.

The invention thus includes among its general features a plurality of sets of indicating elements, the elements of each set being relatively movable to each other, and the sets themselves or elements thereof being relatively movable to each other or so co-ordinated that the reading of one set varies differently but in synchronized relation with the reading of the other set, and suitable means being utilized to accomplish a simultaneous change in the readings of both sets as above stated. Thus the pointer elements and their scales may be moved, relatively to each other, by a single means for setting, and the pointer elements being movable in different degrees for indicating. The same principle may be observed in the relations of the reference means for setting the altimeter, and the foregoing characteristics may have specific utilization in devices wherein the indicator and one of the scales or one of the reference means are relatively movable. It will be noted that one means may be used for ordinary indicating operation of the pointers by the indicator, and a second means to cause the setting as stated, and these means may be coordinated so as to permit setting while indicating movement is occurring, but also with a sufficient degree of independence so that sensitivity of the pointer indications caused by the indicator is assured. The reference means are preferably utilized with the scale means so as to increase in a substantial degree the important advantages of the device for quick, accurate reading and setting. Then again, the instrument may include a plurality of scales and pointers co-ordinated to produce readings that increase and decrease in the same directions, as, for instance, by forming the scales with indicia that increase in opposite directions, and hence, where the movements of certain parts are in the same direction, the readings on both scales vary correspondingly. This result is synchronously maintained, although the relative movements of pointers and scales vary in different degrees.

Although the invention finds its maximum utility when applied to altitude indicating devices that are employed in aircraft, it can be advantageously used with indicators for temperature, stress, flow, and the like.

Referring in detail to the drawings, 10 denotes a device embodying the invention. The same includes a cylindrical casing or the like 11 in which is housed any desired indicator 12. As the invention is not restricted to any particular type of indicator, the latter is shown in conventionalized form. It may be stated, however, that the said indicator is preferably an altimeter of any well known type. This indicator may be rotatably mounted in the casing, for example, by a central stub shaft 13 fixed to the casing, and which extends into a hub 14 on the casing, a screw 15 being threaded into the stub shaft to retain the same in engagement in the hub.

The front part of the casing may include a circular enlargement 16 in which the dial 17 and the glass 18 are positioned. The said dial may be relatively non-rotatable and may be secured in any suitable manner. For purposes of illustration, I show the dial as having one or more lugs 19 formed therein and attached to the part 16 by screws 20.

Extending centrally from the indicator 12 is a spindle 21 that is turned by the indicator mechanism in response to any condition that is to be indicated or measured. On the end of said spindle is mounted a pointer 22.

Fixed on the spindle 21 is a pinion 23, the teeth of which mesh with those of a gear 24. The latter is journaled on a pin 25 that is secured to a member such as the dial 17 that is relatively stationary to the indicator 12. Rotating with the gear 24 in alined relation therewith is a pinion 26 the teeth of which mesh with those of a gear 27. The latter is fixed to a sleeve or a spindle 28 through which freely extends the spindle 21, said sleeve being journaled on a hub 29 secured to the dial. Mounted in any suitable manner on the sleeve is a pointer 30 which may coact with the pointer 22. This completes the mechanism for interconnecting the pointers for ordinary indicating action.

On the dial 17 are one or more reference means scales 31, 32 which are of any suitable form to coact with the pointers. To illustrate, if the device is used as an altimeter, the scale 31 totals an elevation of one thousand feet, while the scale 32 may indicate a maximum of seventeen thousand feet. But the scales can be changed to show any other elevations. It will be noted that the indicator and these scales are rotatable relatively to each other.

The gear train which includes the pinions 23, 26 and the gears 24, 27 interconnecting the pointers is so designed as to cause the latter to move in proper relation to the scales. The setting mechanism, for turning the indicator, the pointers and the reference marks in synchronism or for otherwise adjusting the two scale readings simultaneously by suitable relative movements, will now be described.

Formed in the casing portion 16 is a pocket 33 having opposite walls 34 in which is journaled a spindle 35. On one end of the same is an external fingerpiece 36 for turning the spindle. Mounted on the spindle is a gear 37 the teeth of which mesh with those of a large gear 38 that is connected in any suitable manner with the indicator 12.

Also mounted on the spindle 35 is another gear 39 the teeth of which mesh with those of a larger gear 40. The latter is concentric with the indicator and carries an indicating means, such as a reference mark 41 coacting with the large scale 31. The gear 40 may be mounted in any suitable manner, and as shown herein consists of a ring that overlies and rests against the dial 17, and is journaled on concentric lugs 42 struck therefrom. To retain the said gear ring in position, finger pieces 43 may be secured to the casing to bear against the gear ring.

The gear train 39, 40 is designed to cause the reference mark 41 to move at the same velocity as the large pointer 22, and hence the indicator 12, and the gear train 37, 38.

Associated with the scale 32 is an indicating means, scale, or a reference mark 44 which is movable in synchronism by the following means. The said reference mark 44 is carried by a large gear 45 at the underside of the dial 17. The latter has an arcuate slot 46 through which said reference mark extends. The gear 45 is mounted for rotation in any suitable manner. Thus it may have its central portion removed to provide an opening 47. Secured to the gear in spaced relation to said opening is a ring member 48, that is concentric therewith, and which is journaled in a drum or band 49 that is secured to the gear 38.

Interconnecting the spindle 35 and the gear 45 is a gear train including a pinion 50 on the spindle, a gear and pinion 51, 52 on a shaft 53 that is journaled in the walls 34, and a gear 53*a*, on a similarly mounted shaft 54. The teeth of the gear 53*a* mesh with those of the large gear 45. The reference mark 44 is thus movable synchronously with the pointer 30 and relatively to the indicator 12.

Hence it is seen that the two reference marks 41, 44 are movable as a unit for setting. The simultaneous setting of the reference marks is accomplished by a single or unitary means including members 35, 39, 40, 45, 50 to 53*a*, which is operative wholly independently of the means 23 to 28 for interconnecting the pointers for ordinary indicating action. To effect also a unitary setting in different degrees of the pointer-scale readings, as in the case of the reference marks, interrelative movements may be caused by the means 23 to 28 and the means 35, 37, 38 and 17 which may also be independent of each other or may co-operate to the degree that the setting and ordinary indicating movements may occur simultaneously and without interference of each other, and the setting means retaining the device in set position, for instance, frictionally by the gears.

Figure 4:
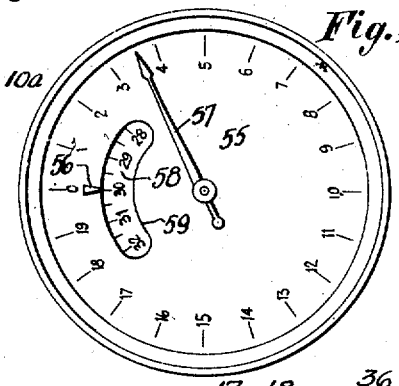
Fig. 4 is a plan view of a modification of the invention.
Figure 2:
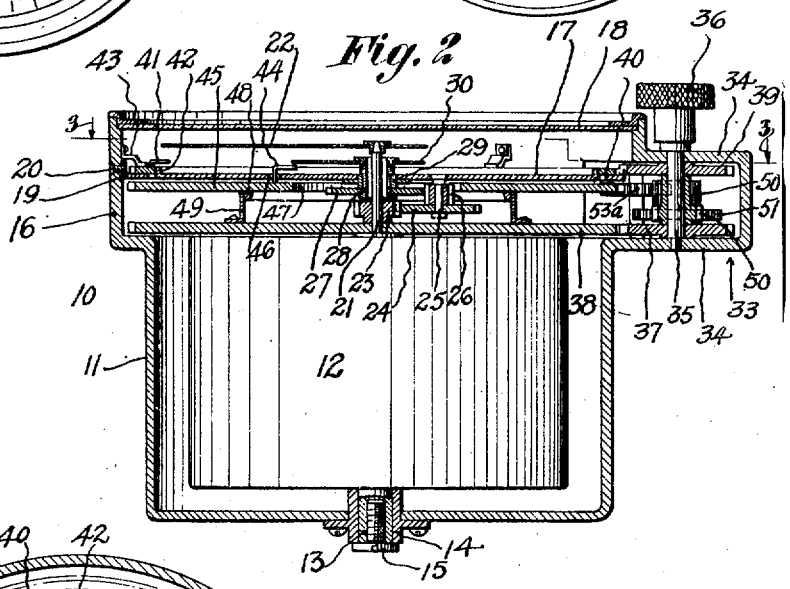
Fig. 2 is an enlarged view in vertical section taken on line 2—2 of Fig. 1.
Figure 3:
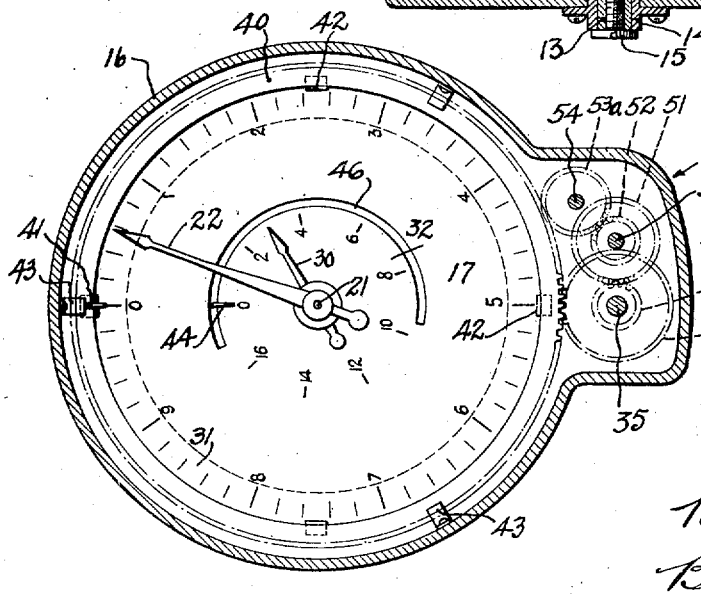
Fig. 3 is a plan view in section taken on the line 3—3 of Fig. 2.

In Fig. 4 is shown a modification 10*a* of the invention in which a dial 55, and a pointer or a reference mark 56 are both relatively stationary, while the pointer 57 may be rotatingly adjustable, together with a scale 58 which may be movable relatively to the indicator together with the reference mark. The latter may be of segmental or ring form and a portion thereof at the reference mark is visible through an opening 59 in the dial. Accordingly, it is seen that instead of moving the reference mark as shown in Figs. 1 to 3, an associated scale may be moved, the scale and reference mark thus constituting a reference means. The relative movement of the scale 58 and the pointer 57 may be according to any suitable graduation, and in the same or opposite direction, this being readily accomplished by any gear train used for the purpose. In all other respects this device is like the one first described.

In order that the readings on both scales may increase or decrease, as the case may be, the scale 58 is provided with indicia that increase in opposite direction to those of the scale 55. Since preferably the pointer 57 and scale 58 are movable in the same direction in setting, it will be perceived that the readings increase or decrease in the same direction.

The following is intended to illustrate a specific manner of use of the altimeter: Assuming that the aviator wants to ascend to 500 feet altitude above his starting point, he sets the reference mark at the time of starting to correspond to the barometric pressure at the point of take off, as expressed in feet altitude. The pointer will then indicate zero and will subsequently indicate the altitude above the ground during the flight. To take care of changes of barometric pressure during the flight the altimeter may be reset from time to time. An important use of the instrument occurs when the aviator desires to descend for landing. He then obtains, as by radio message, shortly before landing, the barometric pressure at the landing field expressed in feet altitude, and sets the reference mark accordingly. Assume that the altitude corresponding to the barometric pressure at the landing field is 300 feet. Then the reference mark 41 may move counterclockwise, to the scale numeral 7, and the pointers including pointer 22 may move counterclockwise. The pointer then will indicate the altitude above the field and will read zero when landing. The aviator is thus assured of an accurate landing guide, especially under conditions of poor visibility as in fog or at night.

It will thus be seen that I have provided a device which fulfills the several objects of the invention and which is well adapted to meet the conditions of practical use. The device is capable of being embodied in widely varying structures in whole or in part, within the scope of the following claims.

I claim:

1. A device of the character described, including means having indicia thereon, movable pointer means, a reference means movable with respect to said pointer means as a unit therewith and in predetermined relation with respect to said indicia, and other means to simultaneously move the reference and pointer means for setting the same.

2. A device of the character described, including a movable indicator having relatively stationary scale means, a pointer, reference means independent of the pointer, unitary means to move the reference means into any desired position with respect to the scale means, and the pointer and indicator in co-ordination with the reference means, said means moving the reference means and the pointer simultaneously and in relatively equal degrees with respect to the scale means.

3. A device of the character described, including means having indicia thereon, pointer means, reference means, other means to move the pointer means, and the reference means with respect to said indicia and in predetermined ratio for an initial setting of the device, and actuating means operating the pointer means independently of the reference means for indicating movement.

4. A device of the character described, including circular, non-rotatable scale means, a plurality of pointers, one of the pointers making a complete rotation for a given movement of the other pointer, reference mark means associated with the pointers and the scale means, means to move the pointers and the reference mark means in predetermined ratio, for an initial setting of the device, and actuating means to operate the pointers independently of the reference mark means for indicating movement with respect to said scale means from the present position, said actuating means being connected to the means for moving the pointers and turning with the latter in the setting of the device.

5. A device of the character described, including a circular, non-rotatable scale means, a pointer and a reference means movable in concentric relation with the scale means, adjusting means to move the pointer and the reference means with respect to said scale means in predetermined ratio for an initial setting of the device, and actuating means to operate the pointer independently of the reference means for indicating movement with respect to said scale means from the preset position, the actuating means being connected to the adjusting means to turn with the pointer for the initial setting mentioned.

6. A device of the character described, including a movable indicator having relatively stationary scale means, a pointer, reference means independent of the pointer, and unitary means to move the reference means into any desired position with respect to the scale means, and the pointer and indicator in co-ordination with the reference means, said unitary means including a rotatable member of relatively large diameter disposed in proximity to the scale means, said rotatable member being connected to the indicator to move the same, and means in proximity to the front of the device for turning the rotatable member.

7. A device of the character described, including a rotatable indicator, the same having relatively stationary scale means, a pointer actuated by the indicator, reference means movable along the scale, and co-ordinated with the pointer, and adjusting means to move the indicator, the pointer and the reference means in predetermined relation to set the same with respect to the scale means, said adjusting means including a rotatable member of relatively large diameter in proximity to the scale means, the rotatable member being concentric with the indicator and being connected thereto, the manual means in proximity to the front of the device for turning the rotatable means and hence the indicator.

8. A device of the character described, including a rotatable indicator, the same having relatively stationary scale means, a pointer actuated by the indicator, reference means movable along the scale, and co-ordinated with the pointer, and adjusting means to move the indicator, the pointer and the reference means in predetermined relation to set the same with respect to the scale means, said adjusting means including manually operated means in proximity to the front of the device, the indicator having means in comparative proximity to the manually operated means and engaged thereby to rotate the indicator.

9. A device of the character described, including an indicator, scale means, pointer means, reference means, and other means coacting with the pointer means, the indicator, and the reference means to cause them to move in predetermined ratio with respect to the scale means.

10. A device of the character described, including a movable indicator, relatively stationary scale means, pointer means therefor, a relatively stationary reference mark, a reference scale means therefor, and means to move the indicator, the pointer means and the reference scale means with respect to the relatively stationary scale means and the reference mark.

11. A device of the character described, including a rotary indicator, a relatively stationary scale means, pointer means therefor actuated by the indicator, a relatively stationary reference mark, a movable reference scale means thereof, and unitary setting means to move the indicator and the pointer means with respect to the relatively stationary scale means and simultaneously the reference scale means with respect to the reference mark.

12. A device including an indicator, scale means, pointer means, a speed reduction means operated by the indicator to actuate the pointer means, reference means, and other means to simultaneously rotate the indicator, pointer means and reference means with respect to the scale means and with the pointer means and reference means moving at a different rate than the indicator and in predetermined relation to the scale means.

13. A device including an indicator, pointer means operated thereby, a combined scale and reference means, relatively movable with respect to each other, and means to move the indicator and pointer means as a unit with respect to the combined scale and reference means for setting the device, said means changing the indication of the combined scale and reference means in synchronism with the indicator and pointer means.

14. A device including a rotary indicator, a rotary pointer means therefor rotatable relatively to the indicator, a scale for the pointer means, reference means and drive means interconnecting the reference means and the indicator and causing the former to rotate at a different rate than the latter.

15. A device including an indicator, a pointer movable by the indicator, a scale for the pointer, a reference means, means for rotating the indicator for setting with the pointer and reference means moving simultaneously with the indicator, said means interconnecting the indicator with the pointer and reference means to cause the latter and the pointer to move angularly with respect to the indicator to maintain the relation of the indicator and the scale.

16. A device including an indicator rotatable for setting the same, a spindle turned by the indicator for normal indicating action, a second spindle, a relatively stationary mounting for the same, pointers for the spindles, a relatively stationary dial, and means interconnecting the spindles to cause the first spindle to rotate the second spindle in synchronism for setting and for normal indicating action with respect to the dial.

17. A device including an indicator, concentric spindles turned thereby, pointers for the spindles, scale means for the pointers, a gear train interconnecting the spindles, said gear train including end gears secured to the spindles, and relatively stationary means independent of the indicator for mounting the intermediate gears of the gear train, said indicator being rotatable in setting the device, whereby the pointers are turned with respect to each other and in predetermined relation to the scale means.

18. A device including an altitude indicator scale means therefor, the indicator and scale means being relatively rotatable, a spindle rotated back and forth by the indicator according to variations in altitude, a pinion on said spindle, a second spindle concentric with the first spindle for slow rotation in synchronism therewith, a pointer and a gear on the second spindle, pinion and gear means interconnecting the first mentioned pinion and gear, and mounting means supporting the pinion and gear means, said mounting and indicator being relatively angularly movable.

19. A device including an altitude indicator, scale means therefor, said scale means being relatively stationary, and said indicator rotatable relative thereto for an initial setting to a position to be maintained stationary during indicating action, a spindle rotated to and fro by the indicator according to changes in altitude and having an otherwise permanent fixed relation to the indicator, a pinion on said spindle, a second spindle concentric with the first spindle for slow rotation in synchronism therewith, a pointer and a gear on the second spindle, pinion and gear means interconnecting the first mentioned pinion and gear, and relatively stationary mounting means supporting the pinion and gear means.

20. A device including an indicator which is rotatable for setting, concentric spindles one of which is rotated by the indicator in setting and turned thereby for normal indicating action, drive means interconnecting the spindles to cause the other spindle to move in synchronism with the first mentioned spindle both in setting and in normal indicating action, and indicating means for the spindles.

21. A device including an indicator which is rotatable for setting, a spindle turned thereby for indicating, a pointer on the spindle, a stationary scale for the pointer, a second pointer, a second spindle therefor, a stationary scale therefor graduated for larger values than the first scale, means independent of the indicator for mounting the second spindle, and means interconnecting the spindles for rotation in synchronism with respect to the scales during setting and during the normal indicating operation of the device.

22. A device including an indicator which is rotatable for setting, concentric spindles one of which is rotated by the indicator in setting and turned thereby for normal indicating action, drive means interconnecting the spindles to cause the other spindle to move in synchronism with the first mentioned spindle both in setting and in normal indicating action, pointer means for the spindles, a scale means for the pointer means, reference means, and actuating means separate of the drive means for rotating the reference means together with the indicator in setting the device.

23. A device including an indicator rotatable for setting, a spindle moving with the indicator in setting and turned by the same with respect thereto for normal indicating action, a second spindle, pointers for the spindles, scale and reference means, and actuating means associated with the indicator, the pointers, and the reference means to cause them to move as a unit with respect to the scale means in setting the device, said actuating means being normally stationary during indicating action and having a portion to cause the first spindle to rotate the second spindle in synchronism at a different rate and in predetermined relation to the scale means for the indicating action.

24. In an altimeter, the combination of an indicator, a dial for the indicator, the latter and the dial being relatively rotatable for setting the device, a pointer turned by the indicator in response to variations in altitude, a second pointer, and means interconnecting the pointers so that the second pointer moves at a different rate than the first pointer, the dial having scales for the respective pointers calibrated according to the movements thereof, said means including a member co-ordinated with the indicator for relative angular movement therebetween of the axis of the member and the axis of the indicator when the indicator and dial are relatively rotated, whereby the pointers are caused to maintain an accurate relation to the scales in setting the device.

25. A device including an indicator, a plurality of scales calibrated for different values, pointers for the respective scales, the indicator including means for moving the pointers with respect to each other, reference mark means, said indicator, reference mark means, and scales being normally relatively stationary, drive means to rotate as a unit the indicator, the reference mark means and the pointers with respect to the scales for setting the device, and other means co-operating with the indicator means to cause the pointers to move with respect to each other according to the scales, as a result of the setting action, with the indicator action being independent of the setting action of said drive means.

26. A device including a rotary indicator, a dial spaced therefrom, pointer means for the dial operated by the indicator, a reference means, a plurality of concentric drive elements of relatively large diameter, one of said elements being connected to the indicator for rotating the same and the other being positioned between the indicator and dial for moving the reference means, and a single actuating means for turning both elements in synchronism and in predetermined different speed relation.

27. A device including a rotary indicator, a dial spaced therefrom, pointer means for the dial operated by the indicator, a reference means, a plurality of concentric drive elements of relatively large diameter, one of said elements being connected to the indicator for rotating the same and the other being positioned between the indicator and dial for moving the reference means, and a single actuating means for turning both elements in synchronism and in predetermined different speed relation, said actuating means including a spindle having a member for turning the element connected to the indicator, and a speed reduction drive for the reference means element actuated by the spindle to cause the reference means to move at a lower speed than the indicator.

28. A device including an indicator rotatable for setting a dial, a spindle operated by the indicator, a second spindle concentric with the first spindle, stationary means for mounting the second spindle, a speed reduction drive interconnecting the spindles for rotating the second spindle at a lower speed than the first spindle, pointers for the spindles, a reference means, and a concentric member of relatively large diameter for moving the reference means, said member having a central opening receiving the said speed reduction drive, and means for turning the indicator and the member at different speeds with respect to each other for setting the device with the reference means moving at the speed of the second spindle.

29. A device including an altitude indicator, pointers therefor having different degrees of movement relatively to each other in setting the device and in normal indicating action, a plurality of scales for the respective pointers, the indicator and one of the scales being relatively rotatable in setting the device, reference means rotatable according to a desired positional relationship of the pointers and the scales, and actuating means to cause the relative positional relation of one pointer with its individual scale to move angularly to the relative positional relation of the other pointer with its scale, said actuating means causing the reference means to move in synchronism with the positional changes mentioned.

30. In an altimeter, the combination of an indicator, pointers therefor having different degrees of movement relatively to each other, a plurality of scales for the respective pointers, the indicator and one of the scales being relatively movable for setting the device, and means to cause the rate of movement of one pointer with respect to its scale to be uniformly different from the rate of movement of the other pointer with respect to its scale in setting and in normal indicating action.

31. A device including an indicator, scale means therefor, a pointer operated by the indicator, and a reference means, connecting means for causing the pointer to move relative to the indicator for normal indication and for setting, actuating means independent of the connecting means to move the reference means relative to the indicator and in synchronism to the pointer thereof, and other means to cause the connecting and actuating means to move as a unit.

32. An altimeter including an indicator, a plurality of scales of different values, individual pointer elements for the scales, reference means, said pointer elements being movable by the indicator relatively to the reference means and in synchronized relation to their scales, and means for causing a relative setting movement between the scales and the pointer elements for setting the altimeter with the reference means caused to move relatively to each other by the setting means and the pointer elements adapted to have different relations to their respective scales and reference means for different indications of the altimeter.

33. A device including an indicator, a plurality of scales of different values, pointer elements for the respective scales movable by the indicator in different degrees according to the scales, the indicator and the scales being relatively movable to each other, and a unitary means for causing a relative movement between the pointer elements, and the scales in different degrees according to the respective scales, in setting the device.

34. An altimeter including an indicator, a plurality of scales, pointer elements for the respective scales, one of the pointer elements being moved by the indicator in normal indicating action, and means for causing a simultaneous relative movement between the pointer elements and their respective scales, including means for moving one of the scales, whereby the altimeter is set.

35. A device including an indicator, a plurality of scales, individual pointers for the scales, drive means for interconnecting the pointers and indicator to cause an indicating movement in different degrees by the indicator of the pointers according to their scales, and actuator means to cause a relative movement between the pointers and scales for setting the device, said actuator means being functionally independent of the drive means so that the indicating and setting actions can occur simultaneously.

36. An altimeter including an indicator, a plurality of scales, pointer elements for the scales, reference means for the respective scales, and means for causing a relative movement between the pointer elements, and the scales, with the reference means moving in co-ordination with the pointer elements, said means including drive means for interconnecting the pointers and indicator to move the pointers in different degrees for indicating, and other means to cause a relative setting movement between one pointer element and its scale different in degree from that for the other pointer element and its scale.

37. A device including an indicator, a plurality of pointers, scales for the respective pointers, reference means, and means for causing a relative movement in different degrees, between the pointers and their corresponding scales and reference means, said scales being so coordinated with the pointers as to produce readings that increase or decrease in the same directions for one pointer and its scale as for the other pointer and its scale.

38. An altimeter including an indicator, a plurality of pointer elements movable relatively to each other, scales for the respective pointer elements movable relatively to each other, said scales having indicia increasing in opposite directions, and means to cause a relative movement between the pointer elements and scales, said means causing a relative rate of movement between one pointer element and its scale different from the relative rate of movement of the other pointer element and its scale.

39. An altimeter, including an indicator, a plurality of pointer elements movable in different degrees thereby, individual reference means for the pointer elements, actuator members for the reference means, and a single means in permanent connection with said actuator members for causing a setting movement of both reference means in different degrees and retaining the reference means in set position during the movement of the pointer elements by the indicator.

40. A device including an indicator, a plurality of pointer elements, reference means for the pointer elements, means interconnecting the pointer elements and indicator to cause a movement in different degrees of the pointer elements, and means operative independently of the first means for causing a simultaneous setting of both reference means and a relative movement between the indicator and one of the reference means.

In testimony whereof I affix my signature.

PAUL KOLLSMAN.